Oct. 2, 1934.   W. A. FRYE   1,975,454
VALVE
Filed May 25, 1932
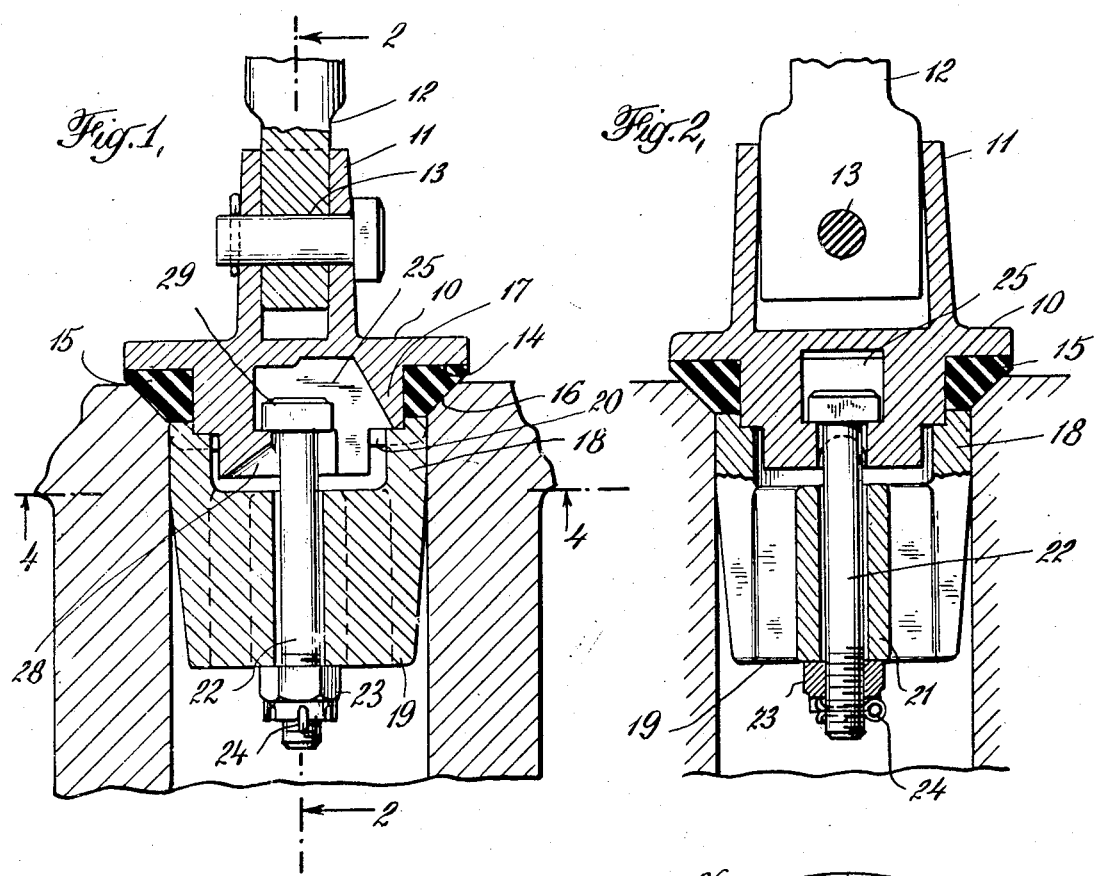
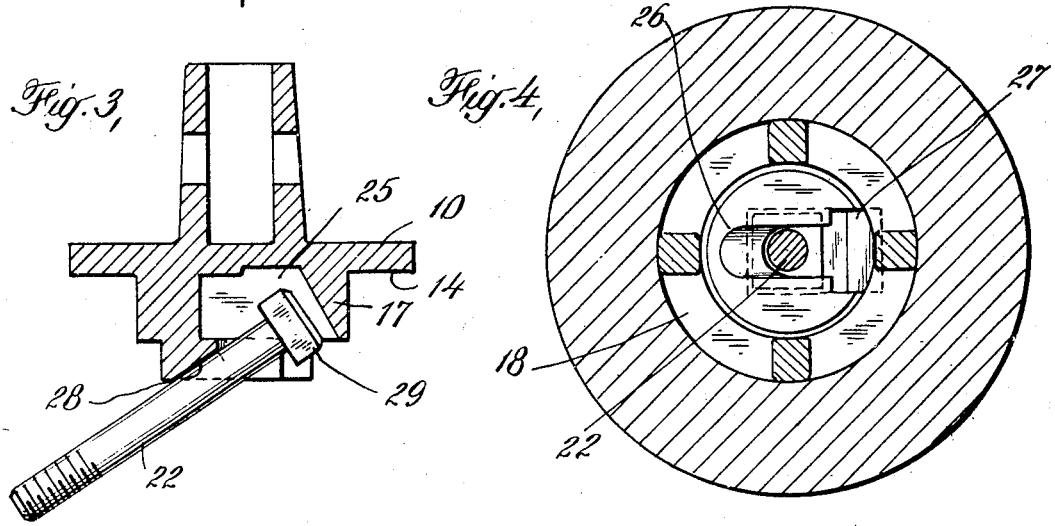
INVENTOR
William A. Frye
BY
*Pennie, Davis, Marvin, Edmonds*
ATTORNEYS Patented Oct. 2, 1934

1,975,454

UNITED STATES PATENT OFFICE 1,975,454

VALVE

William Arthur Frye, Kansas City, Kans., assignor to Sinclair Refining Company, New York, N. Y., a corporation of Maine Application May 25, 1932, Serial No. 613,359

5 Claims. (Cl. 251—159)

This invention relates to valves and is concerned more particularly with a novel valve of the outlet type especially suitable for use in railway tank cars for sealing the tank outlet.

The valves used with railway tank cars up to the present have been of two general types, in one of which the entire valve member is made of metal and the desired sealing effect is obtained by grinding the contacting surfaces of the valve and its seat. Valves of this type are expensive to maintain and they are liable to leak because if a small piece of solid matter adheres to one or the other of the contacting surfaces, the surfaces do not seat properly and liquid may pass between them.

The second general type of valve now in use is one in which the movable member includes a head, a tail piece, and a seat gasket held between the head and tail piece, this gasket being made of a relatively soft material and contacting with the seat when the valve is closed. In one form of gasket valve with which I am familiar, the tail piece has a projecting boss which is threaded into a socket in the head, and this construction is objectionable because the removal of the tail piece from the head in order to replace a worn gasket is liable to be a difficult operation, if the threads become rusted or corroded, and frequently the head or tail piece is damaged and the valve thus rendered useless.

In another form of gasket valve which has been used to a considerable extent, the head and tail piece are secured together by means of a stud bolt which passes through the tail piece and is threaded into the head. The tail piece is held in place against the gasket by a nut on the bolt. With this construction also, the removal of the nut from the bolt is likely to be difficult and frequently results in the bolt being broken. When this occurs, the bolt has to be drilled out of the valve head and in that operation, the threads in the head may be injured so that the head is rendered useless.

The present invention is directed to the provision of an outlet valve of the gasket type in which the head and tail piece are secured together by simple means which permits removal and replacement of the gasket without difficulty. The connection between the head and tail piece is such that if the parts become rusted or corroded, the connection can be destroyed without doing injury to either the head or the tail piece and the connecting element is an ordinary bolt which if destroyed can be replaced at little expense.

For a better understanding of the invention, reference may be had to the accompanying drawing, in which Fig. 1 is a vertical sectional view through the valve;

Fig. 2 is a view on the line 2—2 of Fig. 1;

Fig. 3 is a fragmentary sectional view showing one step in the assembling of the parts; and Fig. 4 is a sectional view on the line 4—4 of Fig. 1.

Referring now to the drawing, the valve is illustrated as comprising a head 10 provided with a hollow projection 11 in which is received the end of an operating rod 12, the rod being secured in place by a bolt 13 passing through openings in the projection and the rod. Formed in the under surface of the head is a circumferential channel 14, in which is mounted a gasket 15 of suitable material, such as a rubber composition which is gasoline proof. This gasket has a conical outer surface which, when the valve is closed, contacts with a conical seat 16. The inner wall of the channel is formed by an extension 17 from the head, the extension passing through the center of the gasket.

The gasket is held in place by a tail piece 18, provided with guide wings 19, and at its top the tail piece has a rim 20 which enters the channel from below and contacts with the lower face of the gasket. The inner surface of the rim fits the outer wall of the extension from the head snugly so that the tail piece and the head are properly centered when secured together. The radial wings of the tail piece extend out from a central hub 21 which has an opening through it and the tail piece and head are connected together by means of a bolt 22 which passes through the hub and carries a nut 23 at its lower end locked in place by a cotter pin 24. The extension 17 from the head is formed with a chamber 25 to receive the head of the bolt 22, the chamber having an entrance opening 26 in the end of the extension. This entrance opening has an enlargement 27 at one end, and at the other end, the wall of the opening is cut away at an angle as indicated at 28.

The proportion of the parts is such that the head 29 of bolt 22 may be introduced into the chamber 25 through the enlargement at the end of the entrance opening and for this purpose, the bolt is placed in the position illustrated in Fig. 3 and the head inserted through the enlarged portion of the opening. When the bolt is then swung to its normal upright position, its head rests on the ledges forming the side walls of the opening and the side walls of the chamber 25 prevent the bolt head from turning. After the bolt has been placed in this position, the gasket is inserted in its channel, the tail piece slipped over the end of the bolt, and the nut is threaded on the bolt and run up to contact with the tail piece. Further turning of the nut causes the tail piece to compress the gasket and hold it securely in position. Although the head of the bolt is mounted loosely in the chamber in the extension of the head and the bolt also passes through the hollow hub of the tail piece with a loose fit, the contact of the rim of the tail piece with the outer wall of the extension centers the tail piece and head.

With the construction described, removal of the gasket requires unscrewing the nut from the bolt, but if the nut is rusted or corroded and cannot be readily removed, the bolt can be cut. The tail piece is then slipped off and the head of the bolt can be slipped out of the chamber in the head without difficulty. Destruction of the bolt, therefore, causes no injury to the head or tail piece and these parts can be used indefinitely. While cutting the bolt is not always necessary in connection with the replacement of the gasket, the loss of the bolt is a matter of little importance because of its cheapness. The gasket used is also inexpensive and the new valve is thus superior to the all-metal type because of its better sealing effect and lower maintenance cost and it is also superior to those forms of gasket-type valve with which I am familiar, because replacement of the gasket can be carried on without doing injury to the main parts of the valve.

I claim:

1. A valve which comprises a pair of members secured together with a gasket serving as a seat element interposed between the members, and means for securing said members together including a bolt passing through one member and having a head lying within a chamber in the other member, said chamber having an opening narrower throughout a portion of its length than the head of the bolt and enlarged throughout the remainder of its length to permit passage of the head of the bolt, said enlarged portion of the opening lying at one side of the head when the parts are in normal assembled relation.

2. A valve which comprises a pair of members secured together with a seat gasket interposed, one of said members constituting the head and being provided with means by which an operating rod may be attached thereto, the other member constituting the tail piece, and means for securing said members together including a bolt passing through one member and into a chamber in the other member, said chamber having side walls spaced apart a less distance than the distance across the head of the bolt from the apex of one angle to that of the diametrically opposed angle and having a slot opening into the chamber, said slot being of less width than the head of the bolt and having an enlargement through which the head of the bolt may pass, said enlargement lying at one side of the bolt head when the parts are in normal assembled relation.

3. A valve which comprises a pair of members secured together with a seat gasket interposed, one of said members constituting the head and the other the tail piece, and means for securing said members together including a bolt passing through one member and through a slot into a chamber into the other member, said bolt having a head in said chamber overlying the defining walls of said slot and said slot having an enlargement at one end to permit passage of the head of the bolt when the latter is tilted out of its normal position in the valve, the wall of the slot at the end opposite to that at which the enlargement lies being cut away to permit the bolt to be tilted.

4. A valve which comprises a head having a circumferential channel in one face, an annular gasket in said channel, said head having an extension passing through said gasket, a tail piece having a rim engaging said gasket and a portion of the wall of said channel, a bolt passing through a bore on said tail piece, and a chamber within the head having an entrance slot in said extension, said bolt entering said slot and having its head overlying the side edges of said slot, said slot having an enlargement at one end for passage of the head of the bolt.

5. A valve which comprises a head having a circumferential channel in one face and an extension in part defining said channel, a chamber within the head having an entrance slot in said extension and gasket in said channel, a tail piece having a rim entering said channel and contacting with the wall thereof to center said tail piece and head, guide wings adapted to center said tail piece before the valve is completely closed, and means for securing said head and tail piece together with said rim engaging the gasket and compressing it, said securing means comprising a bolt passing through a loosely fitting bore in said tail piece and entering the slot in said head, said bolt having its head overlying the edges of said slot.

WILLIAM ARTHUR FRYE.